(12) United States Patent
Kuroda

(10) Patent No.: US 8,167,284 B2
(45) Date of Patent: May 1, 2012

(54) HOOK STRUCTURE FOR SPIRAL SPRING

(75) Inventor: Masato Kuroda, Nisshinn (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 429 days.

(21) Appl. No.: 12/582,058

(22) Filed: Oct. 20, 2009

(65) Prior Publication Data

US 2010/0127443 A1    May 27, 2010

(30) Foreign Application Priority Data

Nov. 25, 2008   (JP) ................. 2008-299310

(51) Int. Cl.
*F16F 1/10* (2006.01)
(52) U.S. Cl. ....................... 267/156; 267/155
(58) Field of Classification Search .............. 267/154, 267/155, 156, 157, 260, 263, 290; 297/364, 297/367 R, 369, 374; 185/9, 45
See application file for complete search history.

(56) References Cited

U.S. PATENT DOCUMENTS

| | | | |
|---|---|---|---|
| 2,481,037 A * | 9/1949 | Pringle | 254/340 |
| 2,797,435 A * | 7/1957 | Decker et al. | 16/198 |
| 3,533,588 A * | 10/1970 | Cregier | 248/309.1 |
| 5,540,117 A * | 7/1996 | Hansel et al. | 74/577 SF |
| 6,652,031 B2 * | 11/2003 | Villarroel et al. | 297/367 R |
| 7,563,049 B2 * | 7/2009 | Peters | 403/97 |
| 7,744,157 B2 * | 6/2010 | Ishihara et al. | 297/367 P |
| 2009/0056393 A1 | 3/2009 | Otsuka | |
| 2009/0250990 A1 | 10/2009 | Endo et al. | |

FOREIGN PATENT DOCUMENTS

JP   2008-54712   3/2008

OTHER PUBLICATIONS

English language Abstract of JP 2008-54712, Mar. 13, 2008.

* cited by examiner

*Primary Examiner* — Robert A Siconolfi
*Assistant Examiner* — Stephen Bowes
(74) *Attorney, Agent, or Firm* — Greenblum & Bernstein, P.L.C.

(57) ABSTRACT

A second spiral spring is smaller than a first spiral spring and is housed in an open space in the center of the first spiral spring. A folded portion that is formed in an inner end of the first spiral spring and a folded portion that is formed in an outer end of the second spiral spring are hooked in a latch plate, under tension, that is cut and raised from a side. A receiving space is formed between the latch plate and an initial winding portion that starts winding in a curved shape from the inner end of the first spiral spring so as to house a tip of the folded portion of the outer end of the second spiral spring that is hooked in the latch plate.

7 Claims, 6 Drawing Sheets

F I G . 4
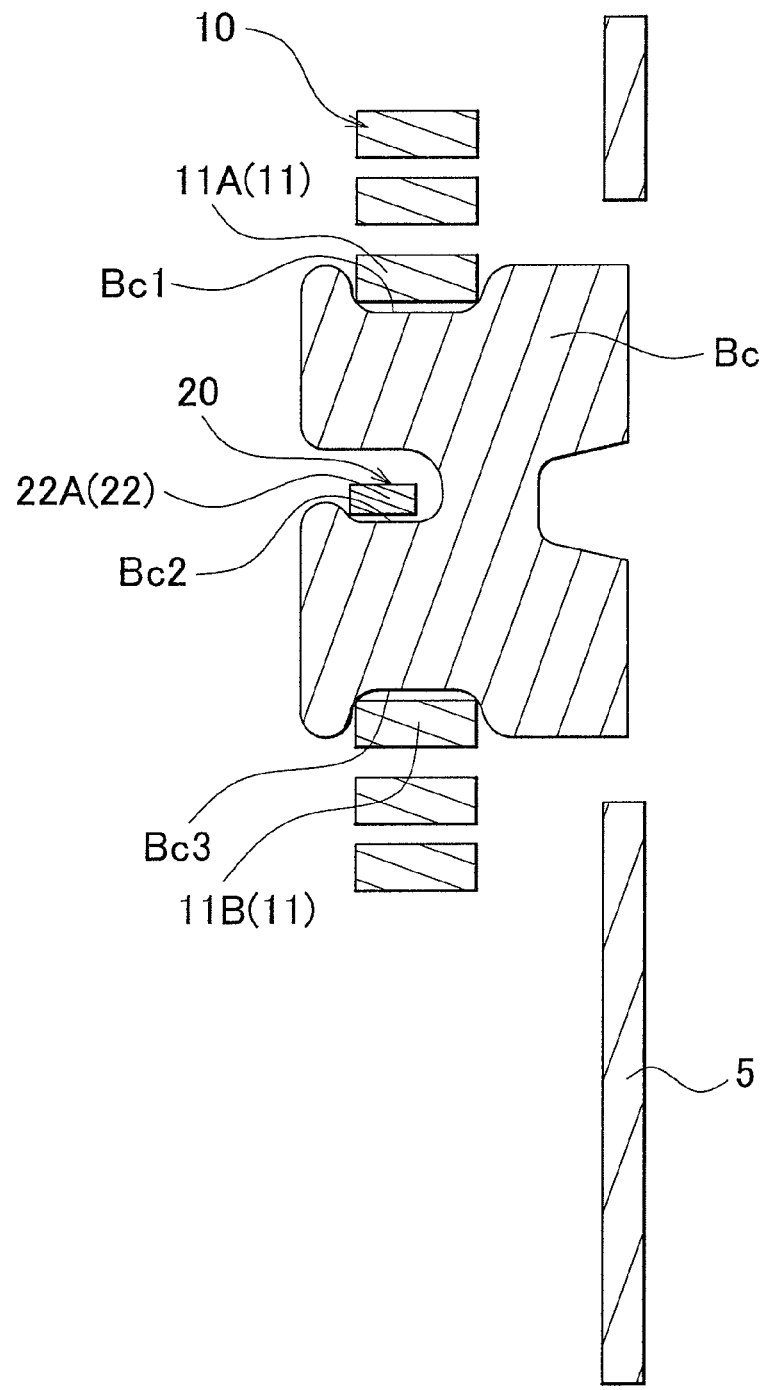

HOOK STRUCTURE FOR SPIRAL SPRING

INCORPORATION BY REFERENCE

The disclosure of Japanese Patent Application No. 2008-299310 filed on Nov. 25, 2009 including the specification, drawings and abstract is incorporated herein by reference in its entirety.

BACKGROUND OF THE INVENTION

1. Field of the Invention

The invention relates to a hook structure for a spiral spring. More specifically, the invention relates to a hook structure for spiral springs in which a small spiral spring is arranged inside a large spiral spring and in which an inner end of the large spiral spring and an outer end of the small spiral spring are both hooked in a latch provided between the springs.

2. Description of the Related Art

Conventionally, a structure with an urging spring, which constantly applies a forward urging force to a seatback, is used to assist in adjusting the reclining angle of the seatback. Japanese Patent Application Publication No. 2008-54712 (JP-A-2008-54712), describes a structure in which a first spiral spring, which constitutes the above urging spring for the seatback, and a second spiral spring, which is smaller than the first spiral spring, are arranged side by side in a side coupler on one side of a vehicle seat as a coupler between the seatback and a seat cushion.

The inner end of the first spiral spring is hooked to a latch that is cut and raised from the frame of the seat cushion and the outer end is hooked to a bracket that is integrally formed with the frame of the seatback. The second spiral spring serves as an auxiliary member that returns an operation lever to its original position after the operation lever is used to release a locked state of a reclining device that locks a reclining angle of the seatback.

The second spiral spring is formed small enough to fit within an inner space of the first spiral spring and housed in the inner space. More specifically, the inner end of the second spiral spring is hooked to one end of an operation shaft that unlocks the reclining device connected with the operation lever. The outer end of the second spiral spring is hooked to the latch to which the inner end portion of the first spiral spring is hooked.

As described above, because the inner end portion of the first spiral spring and the outer end portion of the second spiral spring are both hooked in the latch formed in the frame of the seat cushion, both of the spiral springs are arranged in a small size, and thus the rational structure can be obtained.

Conventionally, the latch is formed in the frame of the seat cushion to hook the inner end of the large spiral spring and the outer end of the small spiral spring, and is formed as a curved plate that curves along the inner peripheral surface of the first spiral spring. Accordingly, the end portions of the spiral springs that are folded and hooked interfere with each other, and thus it is difficult to hook these end portions together in the single latch.

SUMMARY OF THE INVENTION

In the invention, a folded inner end of a large spiral spring and a folded outer end of a small spiral spring are hooked together in a latch that is provided between the springs when the small spiral spring is arranged inside the large spiral spring.

A hook structure for a spiral spring according to one aspect of the invention includes: a first spiral spring; a second spiral spring that is smaller that the first spiral spring and is housed in an open space in a center of the first spiral spring; and a latch that is provided between the first spiral spring and the second spiral spring and to which an inner end of the first spiral spring and an outer end of the second spiral spring together are hooked. An inwardly-folded portion of the inner end of the first spiral spring is hooked to the latch under tension from the inner peripheral side of the first spiral spring. Meanwhile, an outwardly-folded portion of the outer end of the second spiral spring is hooked in the latch under tension from the outer peripheral side of the second spiral spring. A receiving space is formed between an inner peripheral surface of an initial winding portion of the first spiral spring that starts winding in a curved shape from the folded portion of the inner end and an outer surface of the latch that faces the inner peripheral surface of the initial winding portion. When the outer end of the second spiral spring is hooked in the latch from the outer peripheral surface, a tip of the folded portion of the outer end that projects to the outer surface side of the latch is housed in the receiving space.

According to this first aspect of the invention, the second spiral spring is hooked at its outer end portion in the latch, and thus the tip of the folded portion that projects to the outer surface side of the latch is housed in the receiving space. Therefore, the folded end portion of the first spiral spring and the folded end portion of the second spiral spring can be hooked together in the single latch.

In the first aspect of the invention, the latch may be formed as a flat plate. In addition, the receiving space may be formed between the flat outer surface of the latch and the inner peripheral surface of the curved initial winding portion of the first spiral spring.

According to this structure, because the latch is formed in the shape of a flat plate, the receiving space, which is made possible by a difference in shape between the two components, can be formed between the flat outer surface of the latch and the curved inner peripheral surface of the initial winding portion of the first spiral spring. In addition, due to its flat-plate shape, the latch can easily be molded and consequently contributes to an improvement in productivity.

Moreover, the flat-plate latch may be cut and raised from a flat frame that supports a movable body that applies the urging force of the first spiral spring.

According to this structure, due to its flat-plate shape, the latch can be formed further easily and rationally by being cut and raised from the flat flame, and consequently contributes to an improvement in productivity.

The folded portion of the inner end portion of the first spiral spring may be hooked onto a longitudinal end of the latch. In addition, due to its curved shape, a portion of the inner peripheral surface of the initial winding portion distal from the folded portion may abut on an opposite longitudinal end of the latch. The initial winding portion may form an arch over the latch to form the receiving portion.

According to this structure, the inner end and the initial winding portion of the first spiral spring respectively abut on the end and the other end of the latch in the longitudinal direction, and thus, the first spiral spring forms an arch over the latch. Therefore, the receiving space is formed between the first spiral spring and the latch. The receiving space that is supported at two points as described above is not easily deformable. Therefore, a hook space for the outer end portion of the second spiral spring can be stably provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 4 is an enlarged sectional view taken along the line IV-IV in FIG. 2;

DETAILED DESCRIPTION OF EMBODIMENTS

Embodiments of the invention will hereinafter be described with reference to the drawings.

Figure 1:
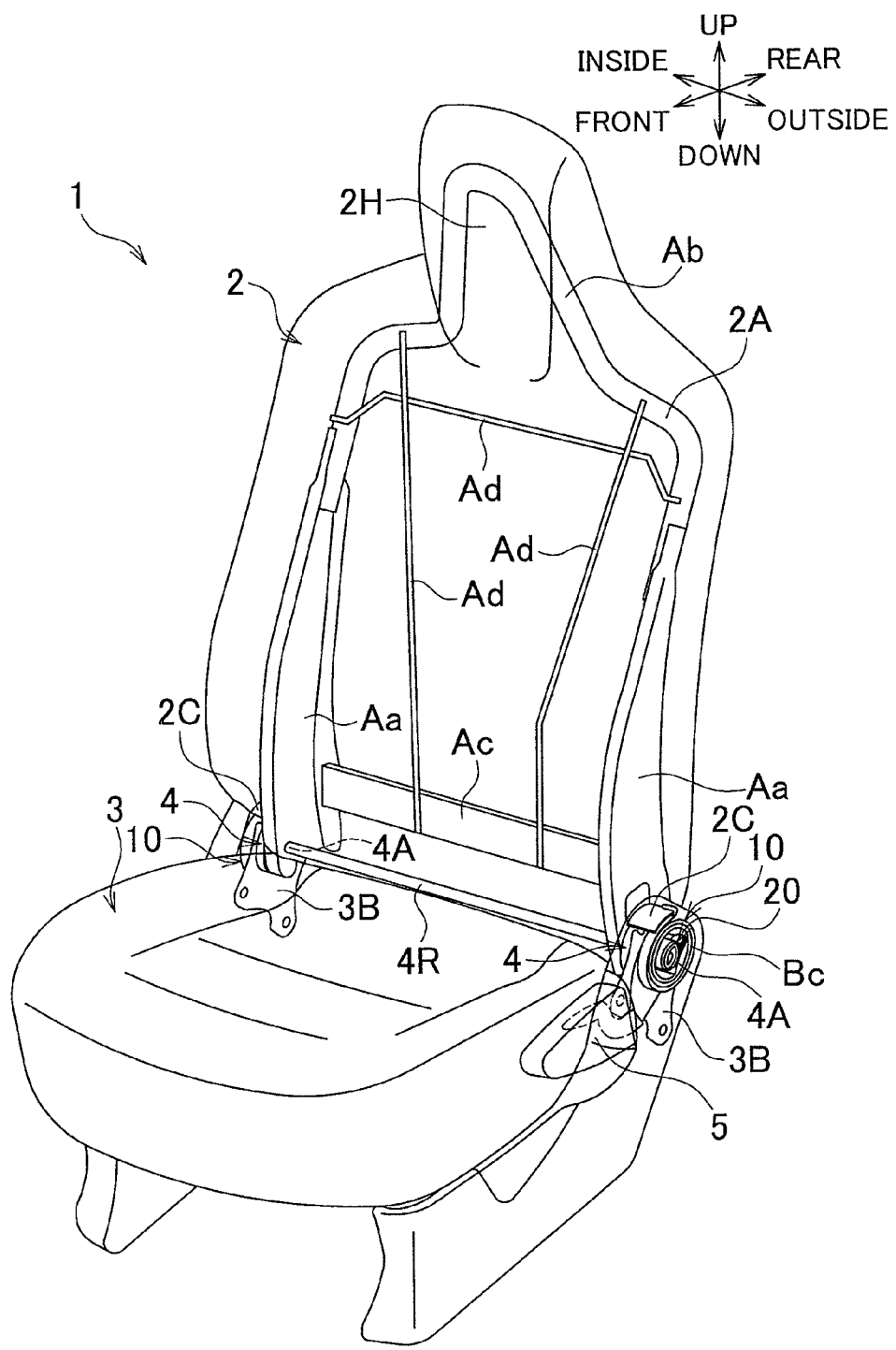
FIG. 1 is a perspective view of a vehicle seat that incorporates a hook structure for a spiral spring in accordance with a first embodiment.

First, a hook structure for a spiral spring in accordance with a first embodiment is described with reference to FIG. 1 to FIG. 5. As shown in FIG. 1, the hook structure for a spiral spring in this embodiment serves to hook a large spiral spring and a small spiral spring (a first spiral spring 10 and a second spiral spring 20) on an outer side of the passenger seat 1 in a right-hand drive vehicle, that is, on the left side of a passenger seated on the vehicle seat 1 or in the right side of the drawing. In this structure, the first spiral spring 10 serves as the large spiral spring of the invention while the second spiral spring 20 serves as the small spiral spring of the invention.

The vehicle seat 1 includes a seatback 2 and a seat cushion 3. The lower end portion on the right and left sides of the seatback 2 are respectively connected with the rear end portion on the right and left sides of the seat cushion 3 via reclining devices 4 configured as rotating shaft devices that rotates the seatback 2 and fix the rotation of the seatback 2 at given positions. Accordingly, the seatback 2 can be changed between a state in which its backrest angle with respect to the seat cushion 3 is fixed and a state in which the backrest angle is adjustable by changing the operating state of each of the reclining devices 4.

The reclining devices 4 constantly fix the backrest angle of the seatback (lock the backrest of the seatback 2 in position) through the urging force of a spring that will be described later. The locked reclining devices 4 are both released when an operation lever 5 provided to one side of the seat cushion 3 is pulled up. In addition, each reclining device 4 is locked again, when the lever 5 is released.

More specifically, each operation shaft 4A that changes between the locked state and unlocked state is inserted in the center of the corresponding reclining device 4. The operation shafts 4A are integrally coupled to each other by a rod 4R suspended between the operation shafts 4A, and turned together when the operation lever 5 rotates the operation shaft 4A on the right side of the drawing.

The specific structure of the reclining device 4 will now be described. Because the basic structure of each reclining device 4 is the same as a known structure that is disclosed in Japanese Patent Application No. 2002-360368 (JP-A-2002-360368), the schematic structure of the reclining device 4 will be briefly described below. The reclining devices 4 are assembled symmetrically, and are interposed on each side of the vehicle seat between the side frame Aa of the seatback frame 2A and the side frame 3B of the seat cushion 3. In addition, each of the reclining devices 4 axially couples each of the side frames Aa and Aa with each of the side frames 3B and 3B for rotation.

The back frame 2A, which constitutes the framework of the seatback 2, includes: the right and left pair of side frames Aa and Aa that are made from vertically-long steel plate members; an upper frame Ab that is made from a steel pipe, and is suspended between and rigidly connected to the upper end of each side frame Aa; and a reinforcing member Ac that is made from steel plate, and is suspended between and rigidly connected to the lower ends of each side frame Aa.

The upper frame Ab is bent at several locations and formed at its center in a width direction with a framework that constitutes a headrest 2H for the passenger in an upward mountain fold shape. In the back frame 2A several support wires Ad are stretched vertically and horizontally to support a thick plate-shaped cushion pad (not shown) from the rear.

Figure 2:
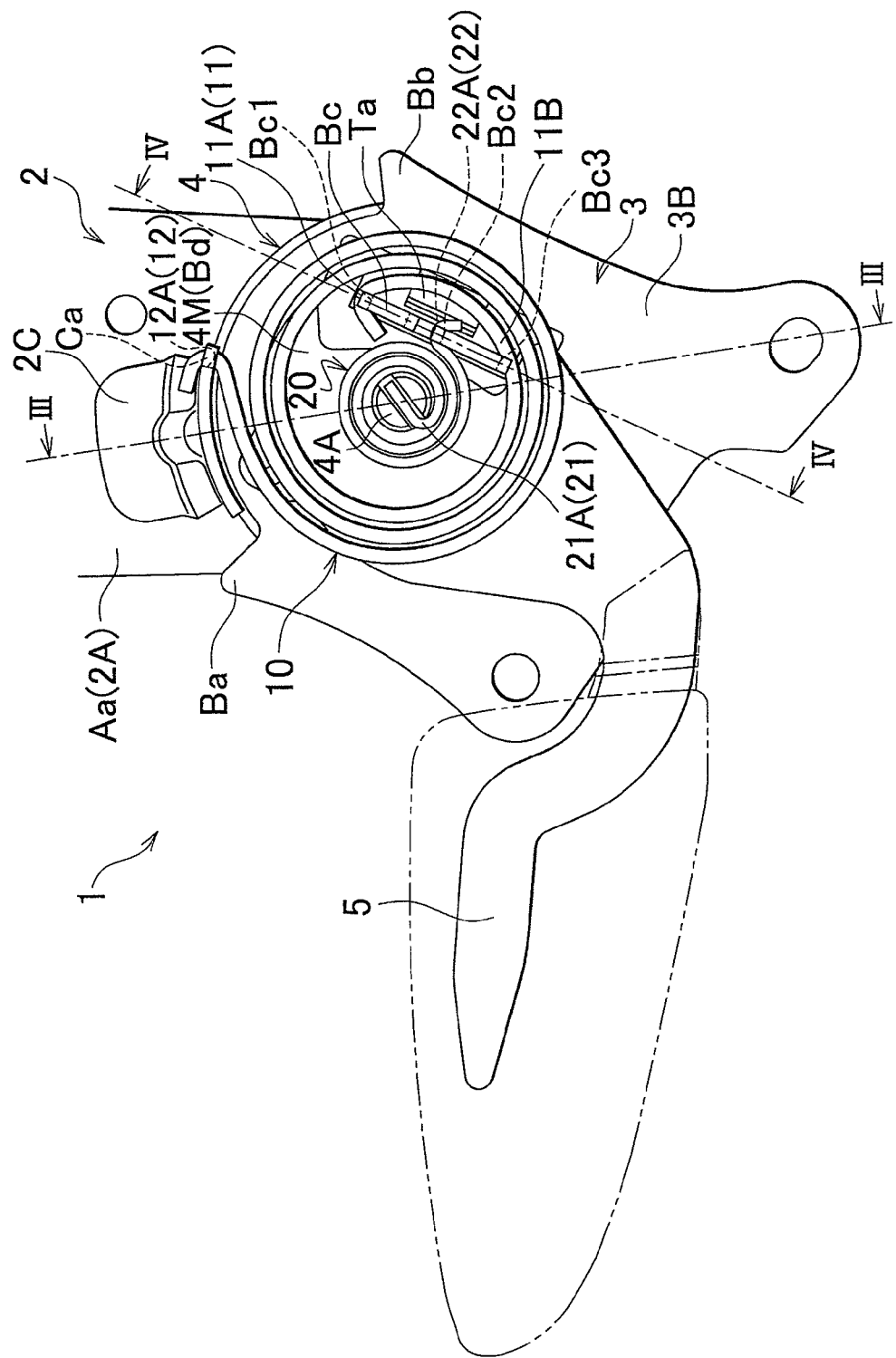
FIG. 2 is an enlarged side view of the hook structure for a spiral spring.
Figure 3:
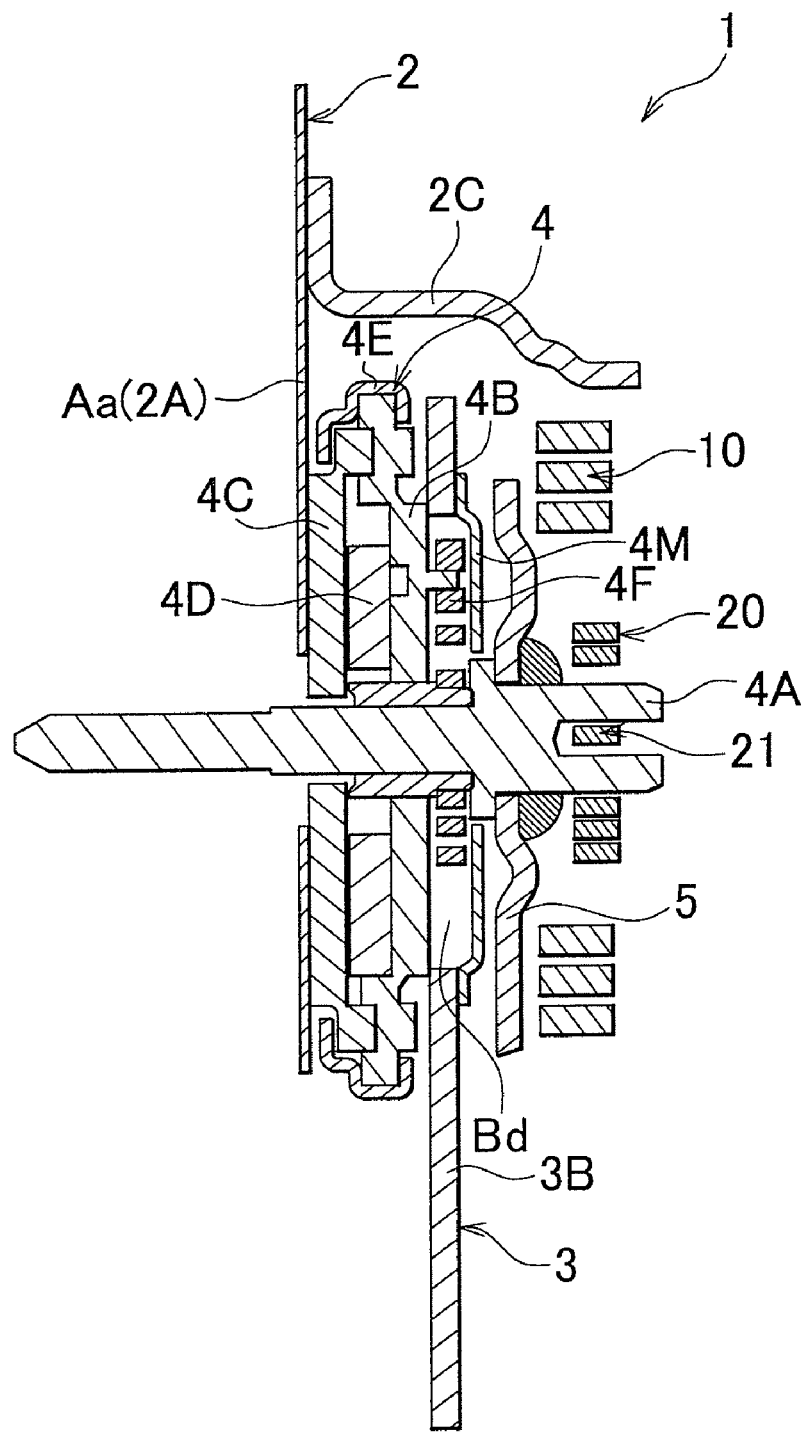
FIG. 3 is an enlarged sectional view taken along the line III-III in FIG. 2.

FIG. 2 is an enlarged view of the structure of a coupling portion between the seatback 2 and the seat cushion 3 in the right side of FIG. 1. FIG. 3 is a cross-sectional view of the reclining device 4 taken along the line III-III in FIG. 2. As shown in FIG. 3, the reclining device 4 is assembled from: a disc-shaped ratchet 4B; a disc-shaped guide 4C; a lock member 4D that is interposed between the ratchet 4B and the guide 4C; an outer peripheral ring 4E in a shape of a stepped cylinder; and a spiral spring used as a lock urging spring 4F.

More specifically, the outer surface of the ratchet 4B, which is on the right side in the drawing, is abutted on and integrally joined with an inner plate surface of the side frame 3B of the seat cushion 3. The outer surface of the guide 4C, which is on the left side in the drawing, is abutted on and integrally joined with an outer plate surface of the side frame Aa of the seat back 2. Then, a flange that projects in an axial direction along the outer peripheral edge of the guide 4C is fitted in a flange that is formed along the outer peripheral edge of the ratchet 4B. Accordingly, the guide 4C is assembled to the ratchet 4B in a manner that they rotatably support each other from inside and outside.

The outer peripheral ring 4E is fitted over the outer peripheral portions of the ratchet 4B and the guide 4C to prevent the ratchet 4B from becoming disengaged from the guide 4C. The lock member 4D is fitted in a space that is formed between the ratchet 4B and the guide 4C. The lock member 4D is supported to allow movement in the radial direction with respect to the guide 4C, and radially moves a gear surface formed on its outer periphery to mesh the gear surface with an inner-peripheral gear surface on the cylindrically-projected outer periphery of the ratchet 4B. Accordingly, the lock member 4D locks relative movement between the ratchet 4B and the guide 4C that is caused by axial rotation.

The lock member 4D is moved in the radial direction when an operation shaft 4A that is inserted through the center of the ratchet 4B and guide 4C, which rotate relative to each other. More specifically, the operation shaft 4A is urged in one rotational direction by an urging force of the lock urging spring 4F, which is hooked between the operation shaft 4A and the ratchet 4B. Thus, the lock member 4D is constantly pushed radially outward and retained to be pressed against and meshed with the ratchet 4B.

Then, the operation shaft 4A is rotated in the opposite rotational direction, against the urging force of the lock urging spring 4F, when the lever 5, which is integrally coupled to the operation shaft 4A (see FIG. 1), is pulled up. Accordingly, the lock member 4D is pulled radially inward so that it is no longer meshed with the ratchet 4B. Consequently, the ratchet 4B and the guide 4C are free to rotate, and thus, the seatback 2 may be rotated with respect to the seat cushion 3 about the rotational center of the ratchet 4B and the guide 4C.

As shown in FIG. 1, each first spiral spring 10 applies an urging force in a direction of forward rotation to the seatback 2 and is hooked between the side frame Aa and the side frame 3B on the corresponding side of the vehicle seat 1. As shown in FIG. 2, the inner end 11 of each first spiral spring 10 is hooked to a latch plate Bc that is cut and raised from the side frame 3B of the seat cushion 3, and the outer end 12 is hooked to a hook portion Ca of an L-shaped latch plate 2C of each side frame Aa of the seat back 2.

More specifically, as shown in FIG. 2, the tip of the inner end 11 of the first spiral spring 10 is folded inwards. The folded portion 11A is hooked on the edge of the latch plate Bc under tension from the inner peripheral side (see also FIG. 4). Meanwhile, as shown in FIG. 2, the tip of the outer end 12 of the first spiral spring 10 is folded outwards. A folded portion 12A is hooked in an edge portion of the latch plate 2C under tension from the inner peripheral side.

Accordingly, as shown in FIG. 1, if each reclining device 4 is released to allow free rotation, the urging actions of the first spiral springs 10 maintain forward tension to follow the movement of the passenger's back when the position of the seatback 2 is adjusted. As shown in FIG. 2, the forward and rearward rotation of the seatback 2 is stopped when a folded front edge portion of the L-shaped latch plate 2C, attached to the side frame Aa of the seatback 2, abuts on a forward stopper Ba that projects from the side frame 3B of the seat cushion 3 and when a rear edge portion of the latch plate 2C abuts on a rearward stopper Bb, respectively.

As described above, when the operation lever 5 is pulled up to release the reclining devices 4, as shown in FIG. 1, the backrest angle of the seatback 2 may be adjusted with the assistance of the urging forces of the first spiral springs 10. Then, when the operation lever 5 is released, the operation lever 5 returns to its original position, and the reclining devices 4 are again locked. Consequently, the adjusted position of the seatback 2 is maintained at the adjusted backrest angle.

The second spiral spring 20, which assists the operation lever 5 to return to its original position after the lever 5 is released, is housed in an open space in the center of the first spiral spring 10 as shown in FIG. 2. The inner end 21 of the second spiral spring 20 is hooked to a groove formed in one end of the operation shaft 4A. The outer end 22 of the second spiral spring 20 is hooked to the latch plate Bc that is cut and raised from the side frame 3B of the seat cushion 3.

More specifically, the tip of the inner end 21 of the second spiral spring 20 is folded inwards. When the folded tip portion is fitted in the groove formed in the end of the operation shaft 4A, a folded portion 21A is hooked to the operation shaft 4A (see also FIG. 3). Meanwhile, as shown in FIG. 2, the tip of the outer end 22 of the second spiral spring 20 is folded outwards. A folded portion 22A is hooked into a recessed portion at the center of the latch plate Bc (a second recessed portion Bc2 to be described later) under tension from the outer peripheral side.

Accordingly, as shown in FIG. 2, when the operation lever 5 that is integrally coupled to the operation shaft 4A in the same side of the drawing is released from the pull-up operation that rotates the operation shaft 4A in the clockwise direction in the drawing, the operation lever 5 is rotated counterclockwise by an urging action of the second spiral spring 20 and returns to its original position. In addition, the operation lever 5 is constantly rotationally urged in a direction to return from the pull-up operation by the urging force of the above-mentioned lock urging spring 4F as shown in FIG. 3. With provision of the second spiral spring 20, the operation lever 5 is assisted to further facilitate its returning operation.

Figure 5:
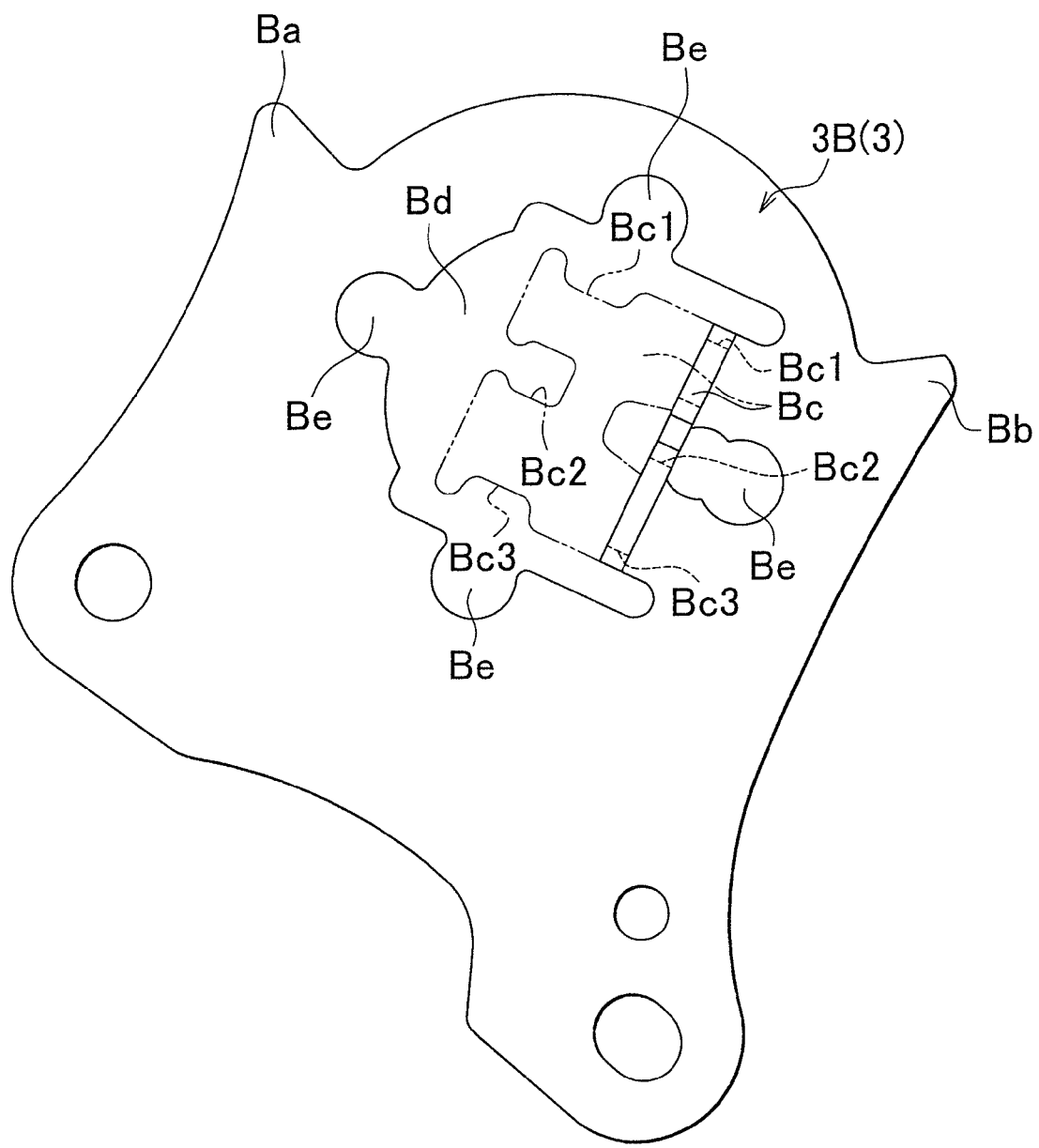
FIG. 5 is an enlarged view of a cut and raised structure of a latch.

As shown in FIG. 2, the outer end 22 of the second spiral spring 20 and the inner end 11 of the first spiral spring 10 are both hooked to the latch plate Bc. The latch plate Bc is formed to hook both the inner end 11 and the outer end 22 without causing interference with each other. The latch plate Bc that hooks both the inner end 11 of the first spiral spring 10 and the outer end 22 of the second spiral spring 20 together serves as the latch of the invention. More specifically, as shown in FIG. 5, the latch plate Bc is cut and raised from the flat side frame 3B and formed in a shape of a flat plate that rises vertically from the side frame 3B.

As shown in FIG. 4, a first recessed portion Bc1 that hooks the folded portion 11A of the inner end portion 11 of the first spiral spring 10 is formed at the peripheral end (upper end in the drawing) of the flat latch plate Bc. The second recessed portion Bc2 that hooks the folded portion 22A of the outer end portion 22 is formed at the center of the flat latch plate Bc. A third recessed portion Bc3 that hooks an initial winding portion 11B, which starts winding in a curve from the folded portion 11A to the outside of the spiral, is formed at the peripheral end (lower end in the drawing) of the flat latch plate Bc (see FIG. 5).

Accordingly, as shown in FIG. 2, the folded portion 11A and the initial winding portion 11B of the inner end portion 11 of the first spiral spring 10 respectively abut on the first recessed portion Bc1 and the third recessed portion Bc3 of the above latch plate Bc, and are suspended in an arch shape to be supported. Consequently, a semicircular receiving space Ta is formed between the initial winding portion 11B of the first spiral spring 10 and an outer surface of the latch Bc that faces the initial winding portion 11B.

The receiving space Ta is formed in a semicircular shape due to the different shapes of the flat latch plate Bc and the curved initial winding portion 11B of the first spiral spring 10. In addition, the receiving space Ta is formed by supporting the curved first spiral spring 10 at two points on the flat latch plate Bc, and thus is prevented from deformation by elasticity of the first spiral spring 10. Accordingly, the outer end portion 22 of the second spiral spring 20 is hooked to the latch plate Bc from the inner surface side, and then the tip of the folded portion 22A that projects to the outer surface side of the latch plate Bc can be housed in this receiving space Ta.

As described above for FIG. 5, the latch plate Bc is cut and raised from the side frame 3B of the seat cushion 3, and a large opening Bd is thereby formed in the side frame 3B. A dowel hole Be is formed around the opening Bd to accommodate a dowel (not shown) that projects from the ratchet 4B of the reclining device 4 (see FIG. 2).

Accordingly, as shown in FIG. 2, the side frame 3B is covered with a thin-plate spatter cover 4M to be protected against entry of weld spatter to the inside from the opening Bd when the ratchet 4B of the reclining device 4 is welded to the side frame 3B.

According to the hook structure for a spiral spring in this embodiment, the outer end 22 of the small spiral spring (second spiral spring 20) is hooked to the latch plate Bc, and thus, the tip of the folded portion 22A that projects to the outer surface side of the latch Bc is housed in the receiving space Ta. Therefore, it is possible to hook the end portions of both the inner end portion 11 of the large spiral spring (first spiral spring 10) and the outer end portion 22 of the small spiral spring (second spiral spring 20), in the single latch plate Bc.

Because the latch plate Bc is flat, the receiving space Ta may be formed between the flat outer surface of the latch plate Bc and the curved inner peripheral surface of the initial winding portion 11B of the large spiral spring (first spiral spring 10) due to the difference in shape between the two components. In addition, because the latch plate Bc is flat, it may be easily formed and thus improves productivity.

Moreover, because the latch plate Bc is flat, it can be cut and raised from the flat side flame 3B and is thus formed easily and rationally, which results in further improvement in productivity.

The large spiral spring (first spiral spring 10) is suspended in the arch shape from the latch plate Bc by respectively abutting the inner end 11 and the initial winding portion 11B on the peripheral end (first recessed portion Bc1) and the other peripheral end (third recessed portion Bc3) of the latch plate Bc, and thus forms the semicircular receiving space Ta between the large spiral spring and the latch plate Bc. The receiving space Ta that is formed by being supported at two points as described above is prevented from deformation. Therefore, a hook space for the outer end 22 of the small spiral spring (second spiral spring 20) can be stably provided.

Figure 6:
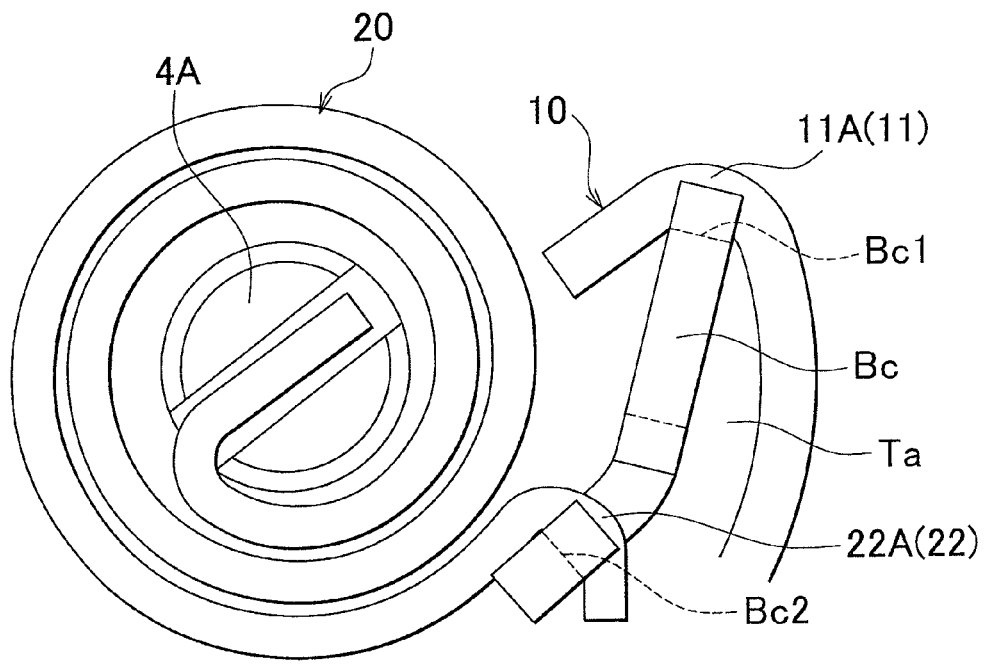
FIG. 6 is a schematic view of a hook structure for a spiral spring in accordance with a second embodiment.

Next, a hook structure for a spiral spring according to a second embodiment is described with reference to FIG. 6. In the second embodiment, components that have substantially the same structures and effects as those in the hook structure for a spiral spring in the first embodiment are denoted with the same reference numerals, and their descriptions are not repeated. A detailed description of the components that differ from those in the first embodiment is provided below.

In this embodiment, the latch plate Bc (latch) that hooks both the folded portion 11A of the inner end 11 of the first spiral spring 10 and the folded portion 22A of the outer end 22 of the second spiral spring 20 is formed as a folded plate that is folded at its center to project outward. Accordingly, the receiving space Ta that can house the tip of the folded portion 22A that projects from the outer surface of the latch plate Bc is formed between the initial winding portion 11B of the first spiral spring 10 and the outer surface of the folded latch plate Bc that faces the initial winding portion 11B.

Figure 7:
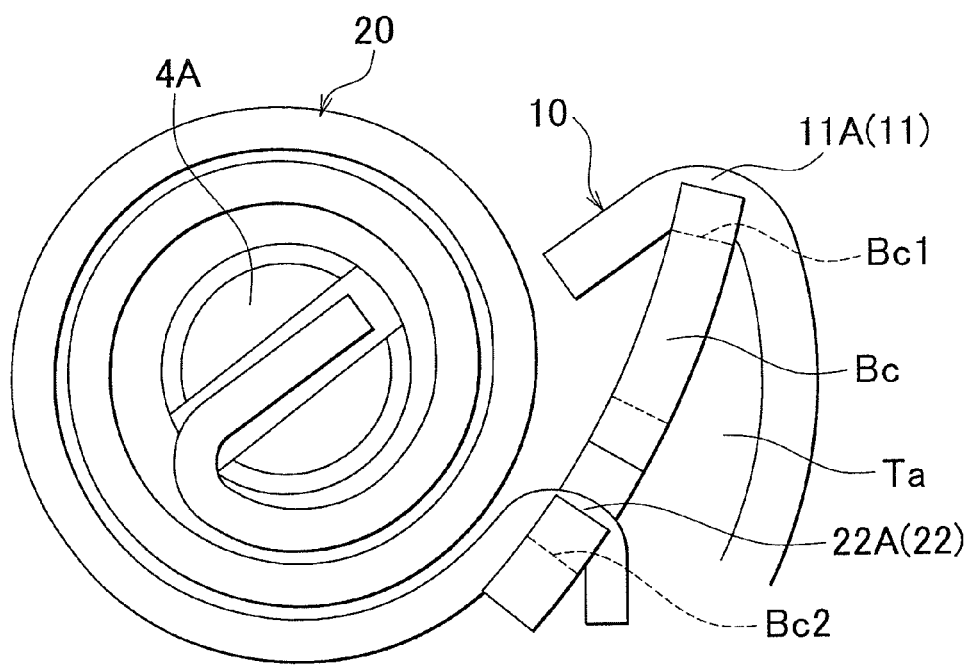
FIG. 7 is a schematic view of a hook structure for a spiral spring in accordance with a third embodiment.

Next, a hook structure for a spiral spring in a third embodiment is described with reference to FIG. 7. In this embodiment, components that have substantially the same structures and effects as those in the hook structure for a spiral spring in the first embodiment are denoted with the same reference numerals, and their descriptions are not repeated. A description is now made in detail on components that differ from those in the first embodiment.

In this embodiment, the latch plate Bc (latch) is formed in a shape of a curved plate with a larger radius of curvature than the curved initial winding portion 11B of the first spiral spring 10. Accordingly, the receiving space Ta that can house the tip of the folded portion 22A that projects from the outer surface of the latch plate Bc is formed between the initial winding portion 11B of the first spiral spring 10 and the outer surface of the curved latch plate Bc that faces the initial winding portion 11B.

The invention is not limited to the three embodiments that have been described so far and may be modified in various ways. For example, the first embodiment showed the structure in which the large spiral spring (first spiral spring 10) abuts at two points on the latch (latch plate Bc) and is suspended in the arch shape therefrom. However, the large spiral spring may abut only at one point on the latch, that is, at a point where the large spiral spring is hooked in the latch. It should be noted that, in this case, the receiving space Ta could easily be deformed due to the flexible deformation of the large spiral spring (first spiral spring 10).

The latch (latch plate Bc) is cut and raised from the flat side frame 3B of the seat cushion 3. However, the latch may be a separate part that is assembled to the side frame 3B. In addition, the latch (latch plate Be) is formed in the open space in the center of the large spiral spring (first spiral spring 10) for the purpose of rationally hooking both the inner end (11) of the large spiral spring and the outer end (22) of the small spiral spring (second spiral spring 20), which is disposed adjacent to the inner end (11). The latch in the invention may also be substantially divided into plural parts or may be arranged separately.

The hook structure for a spiral spring according to the invention may be employed not only in vehicle seats but also in any suitable mechanism where the hook is used to hook both an inner end of the large spiral spring and an outer end of the small spiral spring in a single latch that is provided between the two springs when the small spiral spring is arranged inside the large spiral spring.

What is claimed is:

1. A hook structure for a spiral spring, comprising:
   a first spiral spring;
   a second spiral spring that is smaller than the first spiral spring and is housed in an open space in a center of the first spiral spring; and
   a latch that is provided between the first spiral spring and the second spiral spring and to which an inner end of the first spiral spring and an outer end of the second spiral spring are hooked,
   wherein an inwardly-folded portion of the inner end of the first spiral spring is hooked to the latch under tension from an inner peripheral side of the first spiral spring while an outwardly-folded portion of the outer end of the second spiral spring is hooked in the latch under tension from an outer peripheral side of the second spiral spring,
   a receiving space is formed between an inner peripheral surface of an initial winding portion that starts winding in a curved shape from the folded portion of the inner end of the first spiral spring and an outer surface of the latch that faces the inner peripheral surface, and
   when the outer end of the second spiral spring is hooked in the latch from the outer peripheral surface, a tip of the folded portion of the outer end that projects to an outer surface side of the latch is housed in the receiving space.

2. The hook structure for a spiral spring according to claim 1, wherein
   the latch is formed as a flat plate.

3. The hook structure for a spiral spring according to claim 2, wherein
   the flat-plate latch is cut and raised from a flat frame that supports a movable body that applies an urging force of the first spiral spring.

4. The hook structure for a spiral spring according to claim 1, wherein
   the latch hooks the folded portion of the inner end of the first spiral spring in an end of the latch in a longitudinal direction.

5. The hook structure for a spiral spring according to claim 4, wherein:
   the folded portion of the inner end portion of the first spiral spring is hooked onto the longitudinal end of the latch;
   a portion of the inner peripheral surface of the initial winding portion distal from the folded portion abuts on an opposite longitudinal end of the latch due to the curved shape, and
   the initial winding portion forms an arch over the latch to form the receiving portion.

6. The hook structure for a spiral spring according to claim 1, wherein
   the latch is formed in a shape of a curved thin plate, and a radius of curvature of the latch is larger than that of the initial winding portion of the first spiral spring.

7. The hook structure for a spiral spring according to claim 1, wherein the latch is arranged generally perpendicular to a radial direction of the first spiral spring.

* * * * *